United States Patent
Sasaki

(10) Patent No.: US 6,522,107 B1
(45) Date of Patent: Feb. 18, 2003

(54) DC-DC CONVERTER CIRCUIT FOR PREVENTING BEAT INTERFERENCE

(75) Inventor: Fumihiro Sasaki, Gunma-ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/675,624

(22) Filed: Sep. 29, 2000

(30) Foreign Application Priority Data

Sep. 30, 1999 (JP) ............................................ 11-278583

(51) Int. Cl.⁷ .............................................. G05F 1/656
(52) U.S. Cl. ........................ 323/222; 323/282; 323/351; 455/255; 455/296
(58) Field of Search ................................. 323/222, 259, 323/265, 223, 282, 349, 351; 455/255, 296

(56) References Cited

U.S. PATENT DOCUMENTS

| | | | | |
|---|---|---|---|---|
| 4,361,906 A | * | 11/1982 | Sakamoto | ................... 455/140 |
| 5,412,308 A | * | 5/1995 | Brown | ........................ 323/267 |
| 5,659,241 A | | 8/1997 | Horiuchi et al. | |
| 5,754,419 A | | 5/1998 | Ho | |
| 6,345,175 B1 | * | 2/2002 | Murakami | ................... 331/37 |

FOREIGN PATENT DOCUMENTS

| | | |
|---|---|---|
| EP | 0/779700 | 6/1997 |
| WO | 91/00644 | 1/1991 |
| WO | 95/34120 | 12/1995 |

* cited by examiner

*Primary Examiner*—Michael Sherry
*Assistant Examiner*—Gary L. Laxton
(74) *Attorney, Agent, or Firm*—Hogan & Hartson, LLP

(57) ABSTRACT

A transistor (48) is switched on or off to thereby cause a counter electromotive force on a coil (42) so that a high voltage is charged to a capacitor (46) via a zener diode (44). As a breakdown current of the zener diode (44) flows to the ground via the transistor (48), a voltage lower than a predetermined voltage is applied to the transistor (48). In addition, as the breakdown current of the zener diode (44) does not flow directly to the ground, variance of a boosted voltage can be prevented.

5 Claims, 1 Drawing Sheet

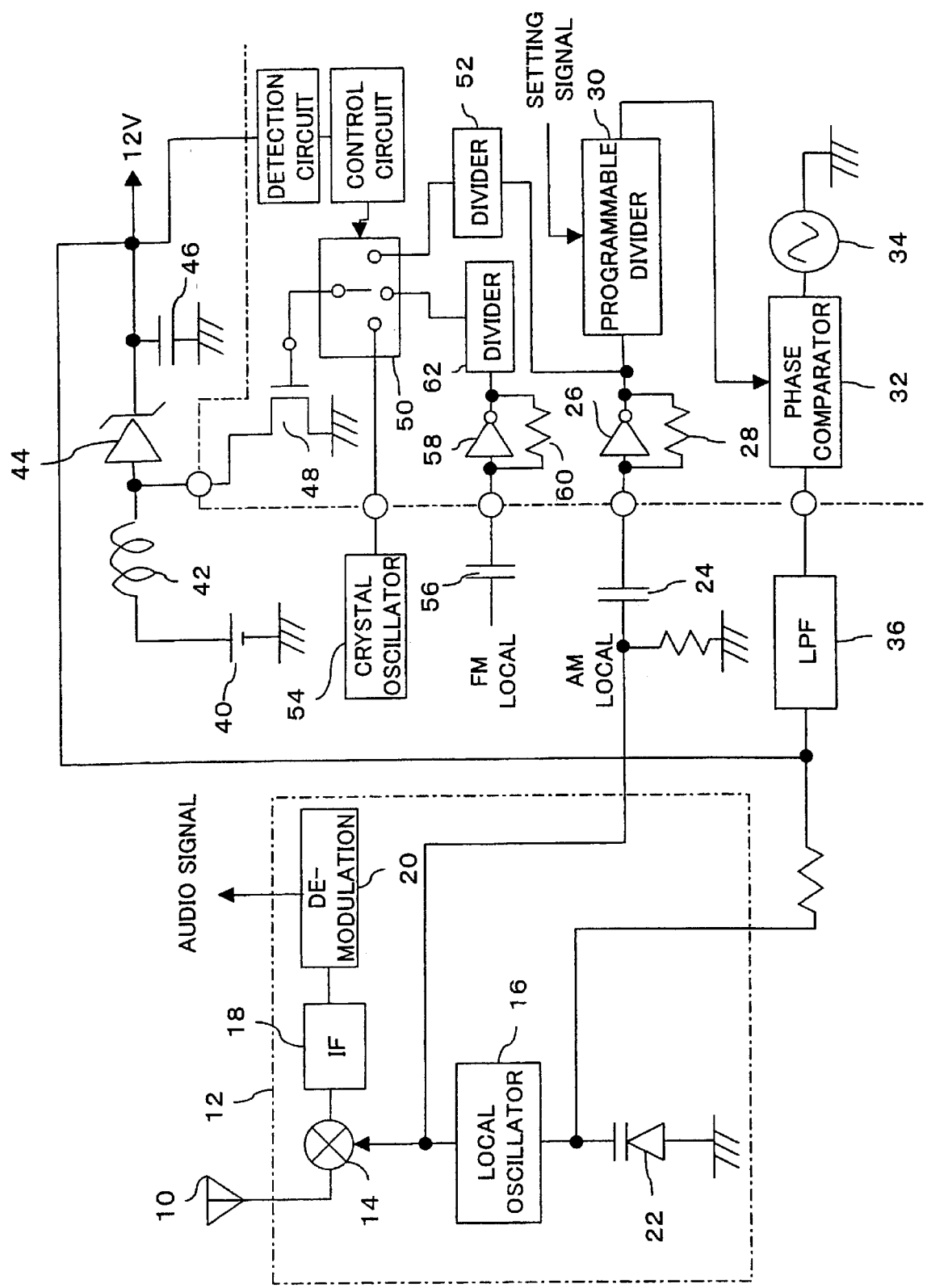

DC-DC CONVERTER CIRCUIT FOR PREVENTING BEAT INTERFERENCE

BACKGROUND OF THE INVENTION

1. Field of the Invention

The present invention relates to a DC-DC converter circuit for use in generating a power source voltage.

2. Description of the Related Art

Portable electronic devices use batteries (dry batteries, secondary batteries, and so on) as their power sources. In personal headphone stereos, for example, two batteries are usually used to power 3V types and one battery to power a 1.5 V type, the latter becoming more popular.

Such low voltage power sources, however, may often be insufficient to fully operate the respective circuits of the devices. Therefore, a booster circuit or the like, which obtains a high voltage by quickly switching an electric current in a coil, using a switching transistor, may be used, and the obtained high voltage is used as a power source voltage of a circuit.

In particular, a headphone stereo incorporating a radio receiver mixes a local frequency signal from a local oscillator and a received RF signal to obtain an IF (intermediate frequency). This requires a local frequency signal according to a frequency of a desired station signal, and, for this purpose, a varactor diode, capable of changing its capacity depending on a voltage, may often be employed. For changing a varactor diode capacity, a voltage of about 12 V is necessary, which may be generated using a booster circuit.

Here, a booster circuit uses a switching transistor for switching on or off a coil current. Generally, various circuits are provided in the form of a semiconductor IC having a transistor, of which compressive strength is about 15 V. However, as an output voltage of the booster circuit increases, a voltage greater than 15 V may be applied to the transistor.

Then, a zener diode with a breakdown voltage of 12 V may additionally be provided parallel to a transistor. A zener diode, however, may quickly flows a current to the ground when it is supplied with a voltage greater than the breakdown voltage. This current may cause a noise in the boosted voltage, resultantly varying a local frequency.

Further, the transistor is switched at a relatively high speed. Should a difference between the switching frequency or harmonic of the switching frequency and the frequency of a received signal fall in an audible frequency band, beat interference may be caused.

SUMMARY OF THE INVENTION

The present invention aims to provide a DC-DC converter circuit which prevents variation in a boosted voltage and suppresses occurrence of beat interference.

According to the present invention, there is provided a DC-DC converter circuit, comprising a coil one end of which is connected to a battery; a transistor one end of which is connected to the other end of the coil, and the other end of which is connected to a ground, for being switched on or off in response to a predetermined clock signal; a zener diode connected at an anode thereof to the other end of the coil, for outputting via a cathode thereof a boosted voltage; and a capacitor connected to the cathode of the zener diode, for maintaining the boosted voltage, wherein the breakdown voltage of the zener diode is set according to compressive strength of the transistor.

With this arrangement, a voltage to be applied to the transistor can be limited by setting a breakdown voltage of the zener diode, so that the transistor can be prevented from being destroyed. In addition, as the zener diode prevents the breakdown current from flowing directly to the ground, variation of the boosted voltage can be prevented.

Further, preferably, the boosted voltage is used as a power source voltage for adjusting a local frequency of a radio receiver, and the predetermined clock signal for switching on or off the transistor in receiving AM broadcasting is a clock obtained by dividing the local frequency. With this arrangement, a difference between a transistor switching frequency and the frequency of a desired station can be always kept out of the audible frequency band, so that occurrence of beat interference can be prevented.

Further, preferably, the predetermined clock signal for switching on or off the transistor in receiving FM broadcasting is a circuit operation main clock or a clock obtained by dividing a circuit operation main clock. For FM broadcasting, the transistor switching frequency is significantly different from the frequencies of FM broadcasting stations. Therefore, with use of a main clock intact or a clock obtained by dividing a main clock, as a transistor switching clock signal, an FM radio receiving circuit having a simpler structure can be realized.

Still further, preferably, the boosted voltage is used as a power source voltage for adjusting a local frequency of a radio receiver, and the predetermined clock signal in receiving FM broadcasting is a clock obtained by dividing the local frequency. When a sufficient voltage cannot be obtained at an output of the booster circuit while receiving FM broadcasting, using a signal obtained by dividing the local frequency allows sufficient boosting.

BRIEF DESCRIPTION OF THE DRAWING

The above and other objects, features, and advantages of the present invention will become further apparent from the following description of the preferred embodiment taken in conjunction with the accompanying drawing wherein:

The Figure 1 is a diagram showing a structure of a DC-DC converter circuit incorporating a radio receiver according to a preferred embodiment of the present invention.

DESCRIPTION OF THE PREFERRED EMBODIMENT

In the following, a preferred embodiment of the present invention (hereinafter referred to as an embodiment) will be described referring to the accompanied drawing.

FIG. 1 is a diagram showing a structure of a radio receiver using a DC-DC converter circuit according to this embodiment. An antenna 10 receives a signal, and supplies the received signal to a receiving circuit 12. The receiving circuit 12 comprises a mixer 14, in which the received signal is mixed with a local frequency signal supplied from a local oscillator 16 thereby being converted into an IF signal. The resultant IF signal is supplied to an IF filter 18, which removes signals other than intermediate frequency from the supplied IF signal, and supplies an output to a detection circuit 20. In the detection circuit 20, the input signal is subjected to detection to be converted into an audio signal for output.

Here, the local oscillator 16 is connected to a varactor diode 22, of which other end is connected to the ground. The oscillation frequency of the local oscillator 16 and, as a result, a local frequency output therefrom may vary depending on the capacity of the varactor diode 22. An output of the local oscillator 16, or a local frequency signal, is supplied to a DC cut capacitor 24, where DC component is removed from the supplied local frequency signal. An output of the DC cut capacitor 24 is subjected to predetermined amplification in an inverter 26 and a resistor 28, both connected in parallel, and a resultant output is supplied to a programmable divider 30.

A programmable divider 30, which divides a local frequency signal of which frequency is determined by adding the frequency of a desired broadcasting station and IF, into a reference frequency (e.g., 10 kHz), sets a dividing ratio allowing such division, and divides the received local frequency signal at the dividing ratio set.

An output from the programmable divider 30 is supplied to a phase comparator 32, which then performs phase comparison between an output from the divider 30 and a reference frequency signal, which the phase comparator 32 also receives from a reference oscillator 34. Then, the phase comparator 32 outputs a signal indicative of the result of phase comparison, or a phase difference, to an LPF 36. The LPF 36 removes an AC component from the supplied signal, and outputs a voltage signal to the cathode side of the varactor diode 22. With the above arrangement, the capacity of the varactor diode 22 is adjusted according to the phase difference, obtained in the phase comparator 32, such that the phase difference becomes zero, a local frequency from the local oscillator 16 comes to be equal to "the frequency of a desired station frequency+IF". As a result, a PLL (phase lock loop) circuit is established.

Here, the capacity of the varactor diode 22 varies in response to applied voltage of from about 0 V to about 12 V. In light of this, a boosted voltage of 12 V is applied to an output of the LPF 36 so as to control, through an output of the LPF 36, a voltage to be applied to the varactor diode 22 within a range between 0 V and 12 V.

A booster circuit for generating a boosted voltage of 12 V will next be described.

A power source voltage 1.5 V from a battery 40 is directly supplied to the respective circuits, including to a coil 42 of a booster circuit. Connected to the other end of the coil 42 is the anode of a zener diode 44, the cathode of which is connected to a capacitor 46, of which the other end is in turn connected to the ground.

Connected to the connection point between the coil 42 and the anode of the zener diode 44 is a transistor 48. By turning on or off the transistor 48 using a predetermined AC signal, an electric current to be supplied to the coil 42 can be quickly varied whereby a counter electromotive force can be caused at the connection point. The caused counter electromotive force is supplied via the zener diode 44 to and charged in the capacitor 46, so that a high voltage can be obtained at the upper end (the opposite end from the ground) of the capacitor 46.

Here, the breakdown voltage of the zener diode 44 is set at 12 V. Thus, should the upper end voltage of the capacitor 46 exceed 12 V, an opposite direction current (a breakdown current) flows into the zener diode 44, and then, through the transistor 48, which is switched on or off, redundant current flows to the ground. Also, according to this configuration, basically, a voltage of 12 V is supplied to the transistor 48 in an off state. Therefore, problems conventionally observed when using a transistor with compressive strength of about 15 V can be avoided.

Further, in this embodiment, the zener diode 44 does not send a breakdown current directly to the ground. Should a breakdown current flow directly to the ground, a relatively large current would be caused to flow toward the ground, which could in turn create noise in the output, or a boosted voltage. This can be avoided using the structure of the present embodiment, in which a breakdown current flows via the transistor 48, i.e., not directly, to the ground. Note that a transistor 48 is preferably a FET (a field effect transistor), but may be an NPN transistor.

The transistor 48 is further connected, at the gate thereof, to a divider 52 via a switch 50. The divider 52 divides an output, or an AM local frequency signal (AM local), from the parallel connected inverter 26 and resistor 28. The switch 50 is also connected to a quartz oscillator 54, which outputs a main clock (e.g., 75 kHz) for a control semiconductor IC. Note that a control semiconductor IC includes the respective circuits shown enclosed by the broken line in the bottom right part of the drawing.

In addition to the above mentioned signal and clock, the switch 50 also receives a signal obtained by dividing an FM local frequency signal (an FM local). That is, an FM local frequency signal for use in receiving an FM signal is supplied via a capacitor 56 to the control semiconductor IC, and then amplified in parallel connected inverter 58 and resistor 60 before being divided in a divider 62 and then supplied to the switch 50.

The switch 50 is switched under control of a control circuit 70. That is, the control circuit 70 determines whether the received signal is for AM or FM broadcasting, referring to an AM/FM signal supplied from a radio switch, and so on, and controls the switch 50 so as to select an output of a divider 52 in the case of receiving AM broadcasting, and to select either an output of the crystal oscillator 54 or an output of the divider 62, i.e., an FM local frequency signal, in the case of receiving FM broadcasting. Here, when receiving FM broadcasting, the control circuit 70 basically controls the switch 50 to select a main clock from the crystal oscillator 54. Whereas, with an output voltage having been lowered of the battery 40, a main clock of about 75 kHz is not sufficient to sufficiently boost a voltage, and a voltage of 12 V cannot resultantly be maintained. In order to address this problem, a detection circuit 72 is provided to observe a boosted voltage, and, when a voltage 12 V cannot be maintained, the control circuit 70 controls the switch 50 to select a signal from the divider 62. A signal from the divider 62 is obtained by dividing an FM local frequency, and has a sufficiently high frequency. With this arrangement, voltage boosting sufficient to maintain a voltage of 12 V can be ensured. Note that the divider 62 is preferably a 256 dividing circuit or a 128 dividing circuit, and may also be a divider with other dividing ratio suitable in consideration of the influence of a harmonic and an output voltage required in a DC-DC converter.

For AM broadcasting, a local frequency is at a value equal to that obtained by adding the frequency of a desired station and an IF, which is 450 kHz. Meanwhile, the divider 52 is, for example, a ½ divider circuit. Therefore, when receiving a broadcasting station at, for example, 520 kHz, a local frequency is 970 kHz and the frequency for switching the transistor 48 is 485 kHz. That is, the difference between the receiving frequency of the AM broadcasting, or 520 kHz, and the switching frequency of the transistor 48 is 35 kHz, which does not fall in the audible frequency band (20 Hz to 20 kHz). Therefore, no beat interference is caused.

In other words, with the frequency of a desired station being x, the switching frequency is (x+450 kHz)/2 in the present embodiment. Therefore, the difference between the switching frequency and the frequency of a signal of a desired station is x/2−225.

As the station at 520 kHz is an AM broadcasting station with the lowest frequency, and the above mentioned difference between the frequency of a desired station signal and a transistor switching frequency will become larger as the frequency of a desired station becomes higher, getting further apart from the audible band. Therefore, the above structure can reliably prevent beat interference.

For FM broadcasting, on the other hand, the switch 50 basically selects an output from the crystal oscillator 54, as described above. The crystal oscillator 54 outputs a main operation clock for the semiconductor IC, the clock having an oscillation frequency of, for example, 75 kHz. In general, a sufficiently boosted voltage can be obtained, similar to the case of receiving AM broadcasting as described above, by switching the transistor 48 at this level of frequency. Alternatively, a dividing circuit may be provided for halving a main clock.

As described above, basically, a main clock of 75 kHz is used in switching the transistor 48 for receiving FM broadcasting because the frequency 75 kHz is significantly different from the receiving frequency of FM broadcasting, or 70 MHz, and the strength of harmonics, if any, is so small that the problem of beat interference will not not occur.

Should the booster circuit fail to output a voltage as high as 12 V, the switch 50 is switched to select an output of the divider 62. As a result, the transistor 48 is switched at a high speed so that boosting capacity of the transistor 48 is improved to maintain a voltage 12 V. Also, use of a local frequency ensures a difference corresponding to IF (10.7 MHz) between frequencies of a desired station and a local frequency signal, preventing occurrence of beat interference.

It should be noted that, although the switch 50 selects either a signal from the crystal oscillator 54 and that from the divider 62 for receiving FM broadcasting in the above embodiment, this selection is not always required. That is, either one of the two outputs may be arranged to be always supplied to the switch 50, with the other being omitted, for use in receiving FM broadcasting all the time.

It should also be noted that, although the drawing shows only an AM receiving circuit, another similar receiving circuit to receive FM broadcasting is actually provided. However, use of a single receiving circuit for receiving both AM and FM broadcasting is preferable.

As shown in FIG. 1, a coil, a capacitor, a battery, and so on are provided basically external to an IC, which is shown enclosed with a dotted boundary line in the drawing. In the example of this embodiment, a tuner IC and a control IC are separate components.

In addition, use of a boosted voltage is not limited to control of a local oscillation frequency, as in the above embodiment, and may preferably include use as a power source for writing or erasing with respect to an EEPROM.

As described above, according to the present invention, only a limited voltage is applied to a transistor as a breakdown voltage is set with a zener diode, so that the transistor can be prevented from being broken down. In addition, variation of a boosted voltage can be prevented as the zener diode prevents a breakdown current from flowing directly to the ground. Further, occurrence of beat interference can be prevented by changing a local frequency for switching on or off the transistor according to a local frequency.

What is claimed is:

1. A DC-DC converter circuit for converting a voltage of a battery into a higher voltage for output, comprising:
   a coil, one end thereof being connected to the battery;
   a transistor, one end thereof being connected to other end of the coil and the other end thereof being connected to a ground, for being switched on or off in response to a predetermined clock signal;
   a zener diode connected, at an anode thereof, to the other end of the coil, for outputting via a cathode thereof a boosted voltage; and
   a capacitor connected to the cathode of the zener diode, for maintaining the boosted voltage; wherein
      the boosted voltage is used as a power source voltage for adjusting a local frequency of a radio receiver; and
      the predetermined clock signal for switching on or off the transistor is a clock obtained by dividing the local frequency for receiving AM broadcasting.

2. A DC-DC converter circuit for converting a voltage of a battery into a higher voltage for output, comprising:
   a coil, one end thereof being connected to the battery;
   a transistor, one end thereof being connected to other end of the coil and the other end thereof being connected to a ground, for being switched on or off in response to a predetermined clock signal;
   a zener diode connected, at an anode thereof, to the other end of the coil, for outputting via a cathode thereof a boosted voltage; and
   a capacitor connected to the cathode of the zener diode, for maintaining the boosted voltage; wherein
      the boosted voltage is used as a power source voltage for adjusting a local frequency of a radio receiver; and
      the predetermined clock signal for switching on or off the transistor is a circuit operation main clock or a clock obtained by dividing a circuit operation main clock for receiving FM broadcasting.

3. A DC-DC converter circuit for converting a voltage of a battery into a higher voltage for output, comprising:
   a coil, one end thereof being connected to the battery;
   a transistor, one end thereof being connected to other end of the coil and the other end thereof being connected to a ground, for being switched on or off in response to a predetermined clock signal;
   a zener diode connected, at an anode thereof, to the other end of the coil, for outputting via a cathode thereof a boosted voltage; and
   a capacitor connected to the cathode of the zener diode, for maintaining the boosted voltage; wherein
      the boosted voltage is used as a power source voltage for adjusting a local frequency of a radio receiver; and
      the predetermined clock signal for switching on or off the transistor is a clock obtained by dividing the local frequency for receiving AM broadcasting, and, a circuit operation main clock or a clock obtained by dividing a circuit operation main clock for receiving FM broadcasting.

4. A DC-DC converter circuit for converting a voltage of a battery into a higher voltage for output, comprising:
   a coil, one end thereof being connected to the battery;
   a transistor, one end thereof being connected to other end of the coil and the other end thereof being connected to a ground, for being switched on or off in response to a predetermined clock signal;
   a zener diode connected, at an anode thereof, to the other end of the coil, for outputting via a cathode thereof a boosted voltage; and
   a capacitor connected to the cathode of the zener diode, for maintaining the boosted voltage; wherein
      the boosted voltage is used as a power source voltage for adjusting a local frequency of a radio receiver; and
      the predetermined clock signal for switching on or off the transistor is a clock obtained by dividing the local frequency for receiving FM broadcasting.

5. A DC-DC converter circuit for converting a voltage of a battery into a higher voltage for output, comprising:
   a coil, one end thereof being connected to the battery;
   a transistor, one end thereof being connected to other end of the coil and the other end thereof being connected to a ground, for being switched on or off in response to a predetermined clock signal;

a zener diode connected, at an anode thereof, to the other end of the coil, for outputting via a cathode thereof a boosted voltage; and a capacitor connected to the cathode of the zener diode, for maintaining the boosted voltage; wherein the boosted voltage is used as a power source voltage for adjusting a local frequency of a radio receiver; and the predetermined clock signal for switching on or off the transistor is a circuit operation main clock or a clock obtained by dividing a circuit operation main clock for receiving FM broadcasting, and, a clock obtained by dividing the local frequency in a case where the power source voltage drops below a predetermined value in receiving FM broadcasting.

* * * * *